United States Patent
Usami

(10) Patent No.: US 8,970,357 B2
(45) Date of Patent: Mar. 3, 2015

(54) VEHICLE-MOUNTED SURROUNDING OBJECT RECOGNIZING APPARATUS AND DRIVE SUPPORT APPARATUS USING THE SAME

(75) Inventor: Masayuki Usami, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/997,825

(22) PCT Filed: Apr. 13, 2011

(86) PCT No.: PCT/JP2011/059182
§ 371 (c)(1),
(2), (4) Date: Jun. 25, 2013

(87) PCT Pub. No.: WO2012/140752
PCT Pub. Date: Oct. 18, 2012

(65) Prior Publication Data
US 2014/0022068 A1  Jan. 23, 2014

(51) Int. Cl.
*G08B 21/00* (2006.01)
*B60R 11/04* (2006.01)
*B60Q 1/14* (2006.01)
*G06K 9/00* (2006.01)

(52) U.S. Cl.
CPC ............... *B60R 11/04* (2013.01); *B60Q 1/143* (2013.01); *G06K 9/00791* (2013.01); *B60Q 2300/112* (2013.01); *B60Q 2300/314* (2013.01)
USPC .......................... 340/435; 340/425.5; 382/104

(58) Field of Classification Search
CPC ........................... B60R 11/04; B60Q 2300/314
USPC ............... 340/425.5, 435, 436, 458; 382/104; 348/148; 356/218
See application file for complete search history.

(56) References Cited

U.S. PATENT DOCUMENTS

| | | |
|---|---|---|
| 6,774,988 B2 | 8/2004 | Stam et al. |
| 2005/0036660 A1 | 2/2005 | Otsuka et al. |
| 2007/0221822 A1 | 9/2007 | Stein et al. |
| 2008/0180528 A1 | 7/2008 | Saito |

FOREIGN PATENT DOCUMENTS

| | | | |
|---|---|---|---|
| JP | 2005-92857 A | 4/2005 |
| JP | 2005-534903 A | 11/2005 |
| JP | 2006-268366 A | 10/2006 |
| JP | 3872179 B2 | 1/2007 |
| JP | 2008-15871 A | 1/2008 |
| JP | 2008-186344 A | 8/2008 |
| JP | 2008-293116 A | 12/2008 |
| JP | 2010-97410 A | 4/2010 |
| JP | 2010-250503 A1 | 11/2010 |

*Primary Examiner* — Jeffery Hofsass
(74) *Attorney, Agent, or Firm* — Sughrue Mion, PLLC

(57) ABSTRACT

A vehicle-mounted surrounding object recognizing apparatus, comprising: a camera that captures an environment surrounding an own vehicle; and an image processing device; wherein the image processing device is configured to process an image captured by the camera to calculate an index value of a color component with respect to an image portion having a luminance value greater than a predetermined value, and determine whether the image portion is related to a light from a surrounding vehicle based on a relationship between the calculated index value of a color component and a predetermined threshold, and the predetermined threshold is changed according to a lighting status of a forward lighting device of the own vehicle.

9 Claims, 13 Drawing Sheets

FIG.3
(A)
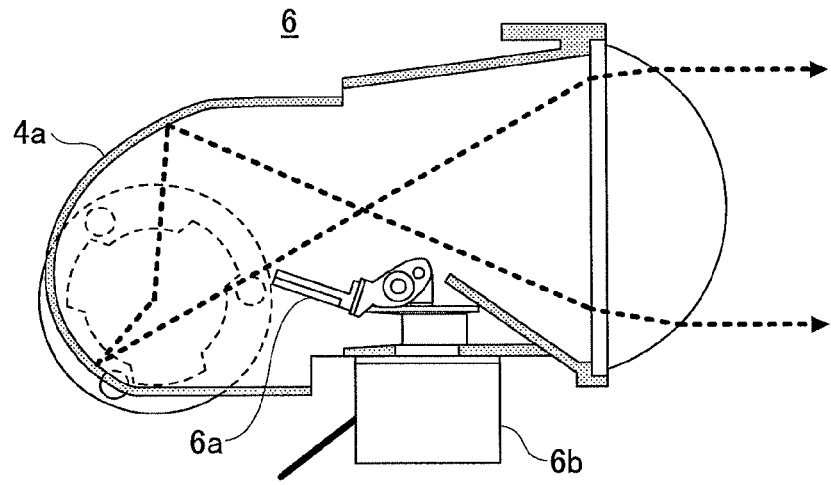
(B)
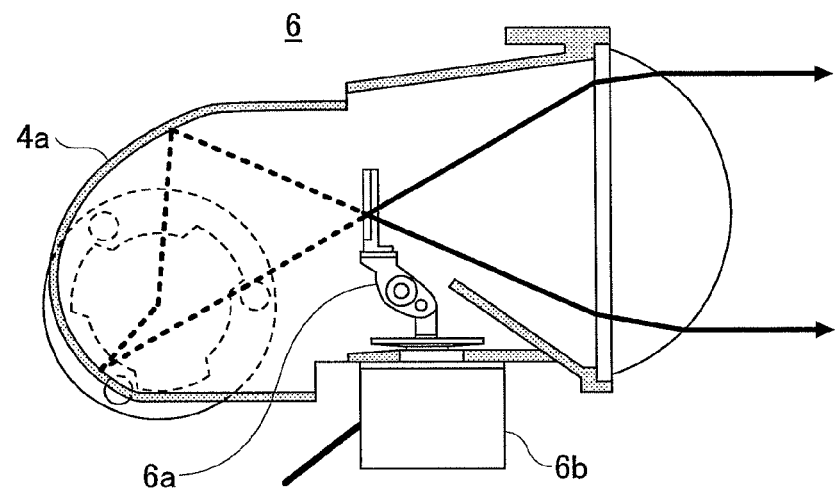

FIG.11
(A)
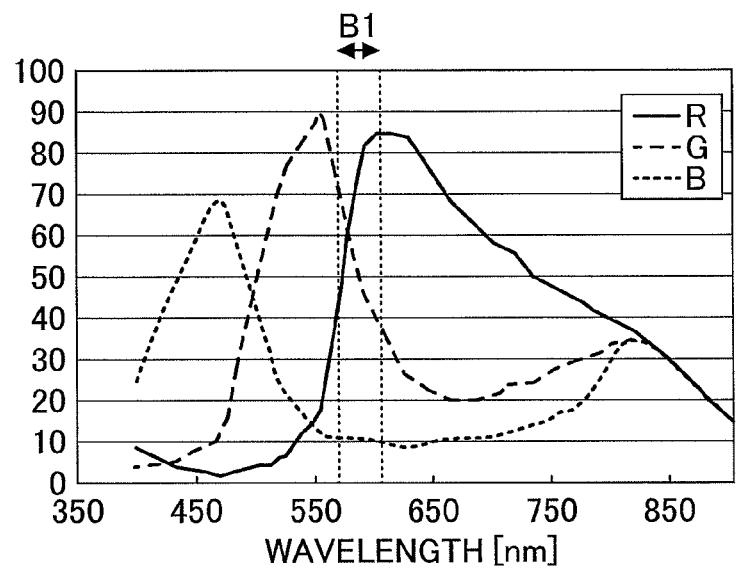
(B)
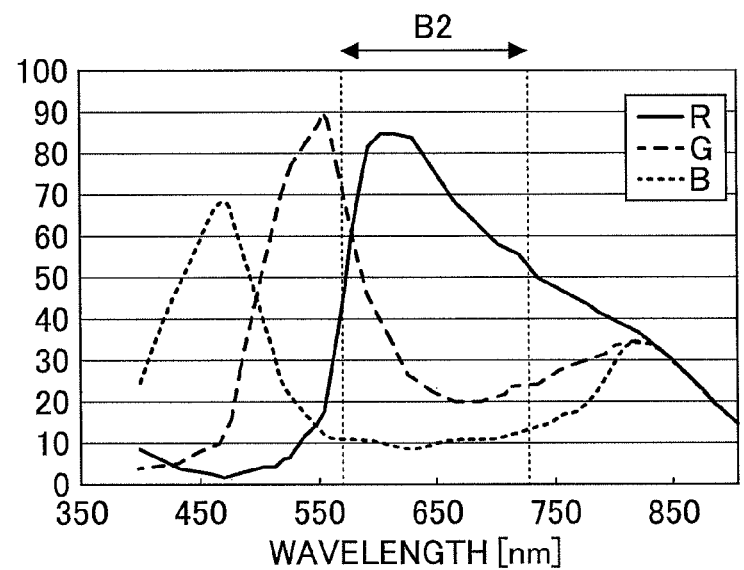

VEHICLE-MOUNTED SURROUNDING OBJECT RECOGNIZING APPARATUS AND DRIVE SUPPORT APPARATUS USING THE SAME

CROSS REFERENCE TO RELATED APPLICATIONS

This application is a National Stage of International Application No. PCT/JP2011/059182 filed Apr. 13, 2011, the contents of all of which are incorporated herein by reference in their entirety.

TECHNICAL FIELD

The present invention is related to a vehicle-mounted surrounding object recognizing apparatus which includes a camera that captures an environment surrounding an own vehicle; and an image processing device, and a drive support apparatus using the same.

BACKGROUND ART

A known technique for recognizing a light, a tail lamp of a preceding vehicle, a head light, a sign or the like on a road side includes processing an image captured by a camera and performing a classification (see Patent Document 1, for example).

[Patent Document 1] United States Patent Application Publication No. 20070221822

DISCLOSURE OF INVENTION

Problem to be Solved by Invention

However, even the same object may be captured differently by the camera depending on a lighting status of a forward lighting device of an own vehicle. For example, if the forward lighting device which projects near infrared light to a forward scene from the own vehicle and a near infrared camera are used to perform image recognition, color characteristics of an image portion of the same object may differ between the case where the near infrared light is projected and the case where the near infrared light is not projected.

Therefore, an object of the present invention is to provide a vehicle-mounted surrounding object recognizing apparatus which changes a way of recognizing an object according to a lighting status of a forward lighting device of an own vehicle, and a drive support apparatus using the same.

Means to Solve the Problem

According to one aspect of the invention, a vehicle-mounted surrounding object recognizing apparatus is provided, which includes: a camera that captures an environment surrounding an own vehicle; and an image processing device; wherein the image processing device is configured to process an image captured by the camera to calculate an index value of a color component with respect to an image portion having a luminance value greater than a predetermined value, and determine whether the image portion is related to a light from a surrounding vehicle based on a relationship between the calculated index value of a color component and a predetermined threshold, and the predetermined threshold is changed according to a lighting status of a forward lighting device of the own vehicle.

Advantage of the Invention

According to the present invention, a vehicle-mounted surrounding object recognizing apparatus which changes a way of recognizing an object according to a lighting status of a forward lighting device of an own vehicle, and a drive support apparatus using the same can be obtained.

BRIEF DESCRIPTION OF DRAWINGS

FIG. 3 is a diagram for illustrating an example of a near infrared light projection apparatus 6.

FIG. 11 is a diagram for illustrating a spectral region of a tail lamp in the spectral response characteristic in FIG. 7(C).

Figure 1:
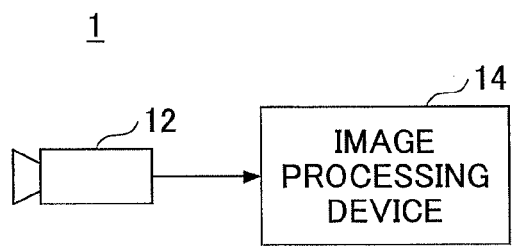
FIG. 1 is a diagram for illustrating a configuration of a vehicle-mounted surrounding object recognizing apparatus 1 according to an embodiment of the present invention.

DESCRIPTION OF REFERENCE SYMBOLS 1 vehicle-mounted surrounding object recognizing apparatus
4 head light
6 near infrared light projection apparatus
6a infrared transparent filter
6b solenoid
12 camera
14 image processing device
100 drive support apparatus

BEST MODE FOR CARRYING OUT THE INVENTION

In the following, the best mode for carrying out the present invention will be described in detail by referring to the accompanying drawings.

FIG. 1 is a diagram for illustrating a configuration of a vehicle-mounted surrounding object recognizing apparatus 1 according to an embodiment of the present invention.

The vehicle-mounted surrounding object recognizing apparatus 1 includes a camera 12 and an image processing device 14.

Figure 2:
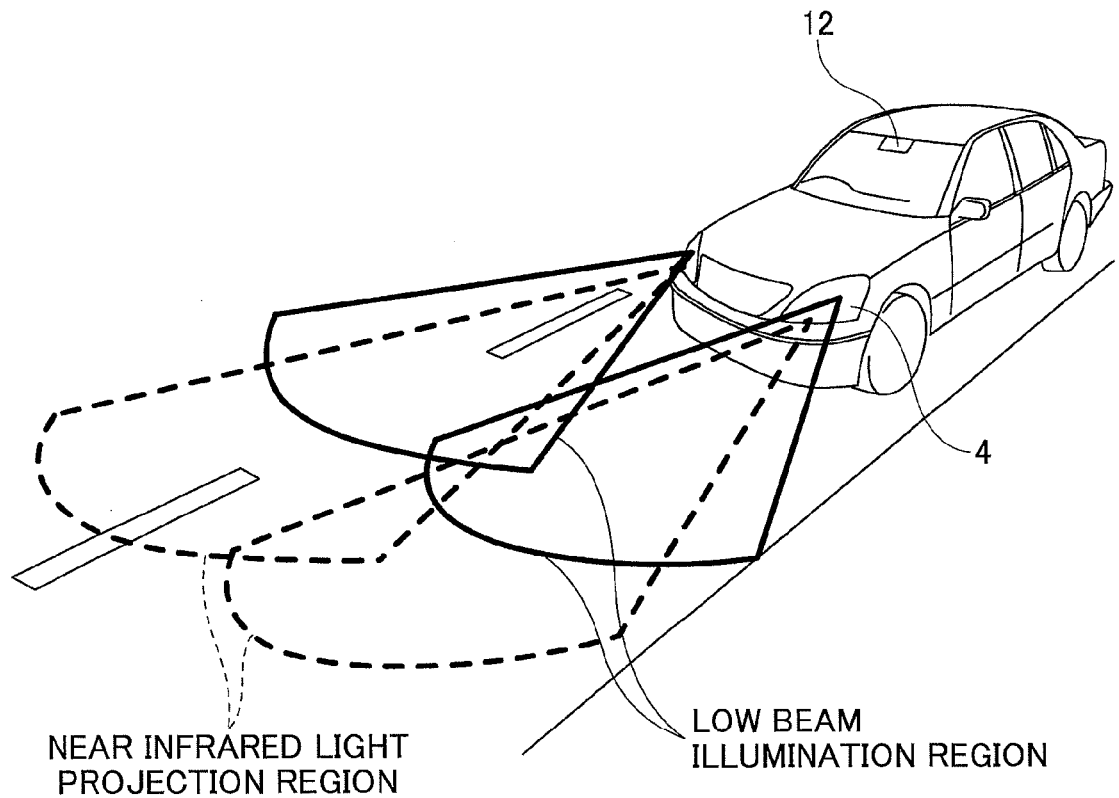
FIG. 2 is a diagram for illustrating an example of an installed status of a camera 12 and an example of a relationship between a low beam illumination region and a near infrared light projection region.

The camera 12 is a near infrared camera which captures a front circumstance image including a road surface in front of an own vehicle with imaging elements, such as CCDs (charge-coupled device) or CMOSs (complementary metal oxide semiconductor), which have high sensitivity to the near infrared light. The camera 12 is attached to a back side of a room mirror (i.e., a surface facing to the front side of the vehicle), for example, as illustrated in FIG. 2. The region which is located in front of the own vehicle and captured by the camera 12 includes a low beam illumination region as a whole described hereinafter or at least a majority of the low beam illumination region. Further, the region which is located in front of the own vehicle and captured by the camera 12 includes a near infrared light projection region as a whole described hereinafter or at least a majority of the near infrared light projection region. The camera 12 may obtain the front circumstance image in real time during driving of the vehicle, and supply the image processing device 14 with the front circumstance image in an image data stream at every predetermined frame cycle.

The image processing device 14 performs image processing of the front circumstance images obtained from the camera 12 to detect a forward vehicle (such as a preceding vehicle or an oncoming vehicle) which may exist in front of the vehicle (i.e., the host vehicle). A way of detecting the forward vehicle in the front circumstance image is described hereinafter.

FIG. 2 is a diagram for illustrating an example of an installed status of a camera 12 and an example of a relationship between a low beam illumination region and a near infrared light projection region. FIG. 3 is a diagram for illustrating an example of a near infrared light projection apparatus 6.

The vehicle on which the vehicle-mounted surrounding object recognizing apparatus 1 is mounted includes the near infrared light projection apparatus 6 as well as a head light 4. The head light 4 emits visible light toward the forward scene. The head light 4 can be switched between an ON state and an OFF state, and emits the visible light in its ON state. Further, the head light 4 can be switched to emit the light with a low beam or a high beam. It is noted that separate light sources may be provided for the low beam and the low beam, or a light source may be shared between the low beam and the low beam. In the latter case, the switching between the low beam and the low beam may be implemented by driving a shade which can be moved such that it selectively blocks the high beam light. In FIG. 2, an example of the illumination region with the low beam is illustrated as the low beam illumination region.

The near infrared light projection apparatus 6 emits near infrared light toward the forward scene. The near infrared light projection apparatus 6 can be switched between an ON state and an OFF state, and emits the near infrared light in its ON state. The near infrared light projection apparatuses 6 are installed on the opposite sides of the vehicle front portion, for example. The near infrared light projection apparatus 6 may be incorporated in a high beam lamp 4a, as illustrated in FIG. 3. In the illustrated example, the near infrared light projection apparatus 6 includes an infrared transparent filter 6a and a solenoid 6b. The solenoid 6b drives the infrared transparent filter 6a between an OFF position illustrated in FIG. 3(A) and an ON position illustrated in FIG. 3(B). In the OFF position, as illustrated in FIG. 3(A), the infrared transparent filter 6a is moved out of the light path of the high beam and thus the high beam light is emitted to the forward scene. On the other hand, in the ON position, as illustrated in FIG. 3(B), the infrared transparent filter 6a is located in the light path of the high beam and thus the near infrared light is emitted to the forward scene. In FIG. 2, an example of the near infrared light projection region is illustrated. It is noted that in the case of using the near infrared light projection apparatus 6, the near infrared light projection region is substantially the same as an illumination region with the high beam (i.e., a high beam illumination region). Here, for the sake of preventing the complexity of the explanation, it is assumed that the near infrared light projection region is the same as the high beam illumination region.

The near infrared light projection region is located farther with respect to the low beam illumination region, for example, as illustrated in FIG. 2. This is because if the near infrared light projection region is set in a region in which the low beam cannot reach or the amount of the illumination with the low beam is insufficient, it is possible to monitor a pedestrian or the like who is located farther such that it is difficult for the driver to perceive it. For example, the low beam illumination region may extend up to about 20 m in front of the own vehicle, and the near infrared light projection region covers the forward region with respect to the low beam illumination region. The near infrared light projection region and the low beam illumination region may be close to each other and have an overlapped portion. Here, a part of the low beam illumination region which does not include the near infrared light projection region is merely referred to as a non-near infrared light projection region.

Figure 4:
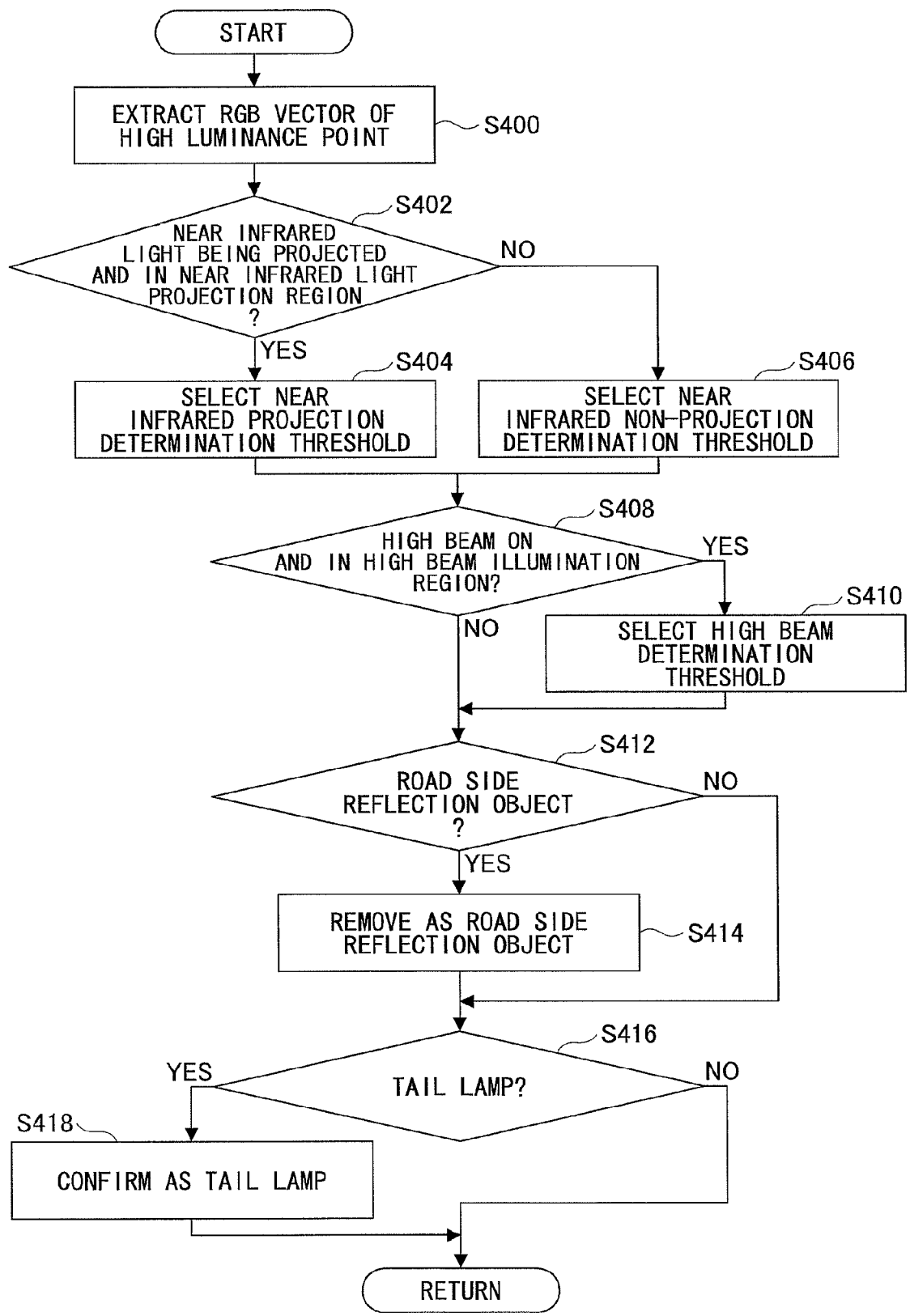
FIG. 4 is an example of a flowchart executed by an image processing device 14 for detecting a tail lamp of a forward vehicle.
Figure 5:
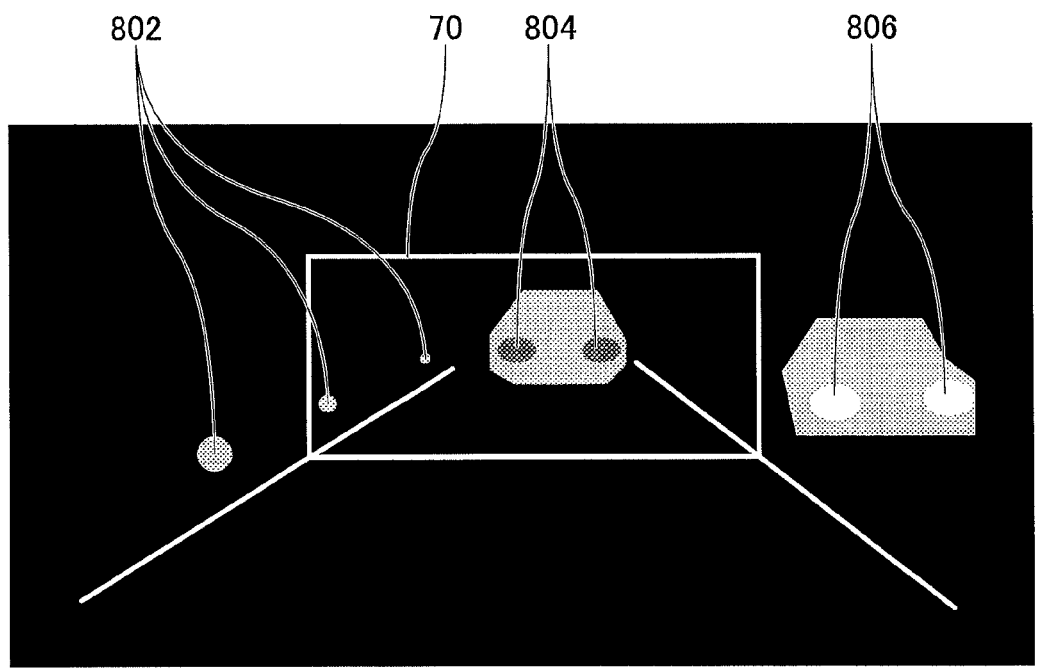
FIG. 5 is a diagram for schematically illustrating an example of a front circumstance image to be processed by the image processing device 14.

FIG. 4 is an example of a flowchart executed by an image processing device 14 for detecting a tail lamp of a forward vehicle. The process routine illustrated in FIG. 4 may be performed at a predetermined cycle during the ON state of the head light 4, for example. FIG. 5 is a diagram for schematically illustrating an example of a front circumstance image to be processed by the image processing device 14. In FIG. 5, a region in the front circumstance image corresponding to the near infrared light projection region is surrounded by a frame 70.

In step S400, an RGB vector of a high luminance point in the front circumstance image is extracted. The high luminance point corresponds to a pixel or a group of pixels having luminance greater than a predetermined luminance. The predetermined luminance may be set and adapted such that an image portion related to the light from the tail lamp is extracted with high reliability. The RGB vector is $(R/(R^2+G^2+B^2)^{0.5}, G/(R^2+G^2+B^2)^{0.5}, B^2/(R^2+G^2+B^2)^{0.5})$. It is noted that if the high luminance point is formed from a group of a plurality of the pixels, the RGB vector may be derived as an average value of the pixels forming the group.

It is noted that if there are a plurality of high luminance points, the RGB vector may be calculated on a high luminance point basis, and the processes from step S402 are performed on a high luminance point basis. If there are two pairing high luminance points detected as tail lamp candidates, the RGB vectors may be calculated for these two high luminance points, respectively, and the processes from step S402 may be performed for the these two high luminance points, respectively. Alternatively, a RGB vector may be calculated collectively for these two high luminance points, and the processes from step S402 may be performed.

For example, in the case of the example illustrated in FIG. 5, in step S400, reflection light 802 from a road side reflection object (a delineator in this example), light 804 from the tail lamp of the preceding vehicle and light 806 of a head light of the oncoming vehicle may be detected as the high luminance points. It is noted that the reflection light 802 from the delineator is mainly due to the light from the head light 4 of the own vehicle. The light 804 from the tail lamp of the preceding vehicle and the light 806 of a head light of the oncoming vehicle is self-emitting light generated in the ON state of the respective lamps.

In step S402, it is determined whether the near infrared light projection apparatus 6 is in its ON state (i.e., projecting the near infrared light) and the high luminance point exists in the near infrared light projection region (see reference numeral 70 in FIG. 5). If it is determined that the near infrared light projection apparatus 6 is in its ON state and the high luminance point exists in the near infrared light projection region, the process routine goes to step S404. On the other hand, if any one of or both of these conditions are not met, the process routine goes to step S406. For example, if the near infrared light projection apparatus 6 is in its ON state but the high luminance point exists out of the near infrared light projection region, the process routine goes to step S406.

In step S404, a determination threshold for a near infrared light projection (referred to as "near infrared projection determination threshold") is selected, and the process routine goes to step S408. The near infrared projection determination threshold delimits between the light from the tail lamp of the preceding vehicle in the near infrared light projection region and the reflection light from the road side reflection object in the near infrared light projection region. The near infrared projection determination threshold delimits them by utilizing the difference in the RGB vector between the high luminance point due to the light from the tail lamp of the preceding vehicle in the near infrared light projection region and the high luminance point due to the reflection light from the road side reflection object in the near infrared light projection region. The near infrared projection determination threshold may be set and adapted based on experimental data (experimental data of the RGB vector of the high luminance point due to the light of the tail lamp of the preceding vehicle in the near infrared light projection region, and experimental data of the RGB vector of the high luminance point due to the reflection light from the road side reflection object in the near infrared light projection region, for example). Another example of a way of setting the near infrared projection determination threshold is described hereinafter together with a way of setting other determination thresholds.

In step S406, a determination threshold for a non-near infrared light projection (referred to as "near infrared non-projection determination threshold") is selected, and the process routine goes to step S408. The near infrared non-projection determination threshold delimits between the light from the tail lamp of the preceding vehicle in the non-near infrared light projection region and the reflection light from the road side reflection object in the non-near infrared light projection region. The near infrared non-projection determination threshold delimits them by utilizing the difference in the RGB vector between the high luminance point due to the light from the tail lamp of the preceding vehicle in the non-near infrared light projection region and the high luminance point due to the reflection light from the road side reflection object in the non-near infrared light projection region. The near infrared non-projection determination threshold may be set and adapted based on experimental data (experimental data of the RGB vector of the high luminance point due to the light of the tail lamp of the preceding vehicle in the non-near infrared light projection region, and experimental data of the RGB vector of the high luminance point due to the reflection light from the road side reflection object in the non-near infrared light projection region, for example). Here, the near infrared projection determination threshold and the near infrared non-projection determination threshold differ from each other. This is because the spectral response characteristic of the camera 12 differs between the near infrared light projection region and the non-near infrared light projection region. Another example of a way of setting the near infrared non-projection determination threshold is described hereinafter together with a way of setting other determination thresholds.

In step S408, it is determined whether the high beam is in its ON state and the high luminance point exists in the high beam illumination region. If it is determined that the high beam is in its ON state and the high luminance point exists in the high beam illumination region, the process routine goes to step S410, and otherwise (i.e., if at least one of the conditions is met) the process routine goes to step S412.

In step S410, a determination threshold for a high beam (referred to as "high beam determination threshold") is selected, and the process routine goes to step S412. The high beam determination threshold may be selected based on the determination threshold (near infrared non-projection determination threshold or near infrared projection determination threshold) which has already been selected. For example, in the case where the near infrared projection determination threshold has already been selected, the high beam determination threshold may be corrected by increasing a predetermined value corresponding to the increased luminance with respect to the near infrared projection determination threshold. This is because if the high beam is in its ON state, the luminance of the high luminance point (only in a visible light range) increases due to the reflection light from the road side reflection object in the near infrared light projection region. On the other hand, in the case where the near infrared non-projection determination threshold has already been selected, the high beam determination threshold may be the same as the near infrared non-projection determination threshold. Another example of a way of setting the high beam determination threshold is described hereinafter together with a way of setting other determination thresholds.

In step S412, it is determined whether the high luminance point is due to the road side reflection object based on a relationship between the selected determination threshold and the RGB vector calculated in step S400. If it is determined that the high luminance point is due to the road side reflection object, the process routine goes to step S414, but if it is determined that the high luminance point is not due to the road side reflection object, the process routine goes to step S416.

In step S414, the high luminance point for which it is determined that it is due to the road side reflection object is removed, and the process routine goes to step S416. It is noted that if there is no remaining high luminance point as a result of this removal, the process routine may end as it is (In this case, it is determined that it is determined that the tail lamp of the preceding vehicle has not been detected at this process cycle).

In step S416, it is determined whether the high luminance point is due to the light from the tail lamp of the preceding vehicle. The way of determining this may be arbitrary. For example, the determination may be performed by considering color characteristics, attributes (two paired or not, for example), motion, etc., of the tail lamp of the preceding vehicle. An example of a way of detecting the tail lamp is described hereinafter.

In step S418, it is confirmed that the high luminance point is due to the light from the tail lamp of the preceding vehicle. In other words, the tail lamp of the preceding vehicle is detected.

As described above, an index value of a color component of the high luminance point which is derived by processing the front circumstance image (such as the respective components of the RGB vector), even if it is related to the same object (the road side reflection object, for example), differs between the case where the object exists in the near infrared light projection region and the case where the object exists in the non-near infrared light projection region.

In this connection, according the embodiment, since the determination threshold for determining whether the tail lamp or the road side reflection object is detected is changed according to the lighting status (the respective statuses of the high beam and the near infrared light projection apparatus 6) of the forward lighting device of the own vehicle, it is possible to delimit between the object to be recognized (or the object to be removed) and other objects (including noise or the like) with high accuracy. With this arrangement, the accuracy of the image recognition for the forward vehicle with the image processing device 14 is improved.

It is noted that, in the process routine illustrated in FIG. 4, the determination in step S416 may be omitted depending on a manner in which the high luminance point is extracted in step S400. For example, if only the two paired high luminance points are extracted in step S400, the high luminance points due to the light from the head light are removed, and only the two paired high luminance points remain via step S414 or a negative determination in step S412, it may be confirmed that the two paired high luminance points are due to the light from the tail lamp of the preceding vehicle. In this case, in step S412, it is determined, based on the relationship between the selected determination threshold and the RGB vector of the two paired high luminance points calculated in step S400, whether the two paired high luminance points are due to the light from the tail lamp of the preceding vehicle or due to the reflection light from the road side reflection object. It is noted that the high luminance points due to the light from the head light of the oncoming vehicle (light 806 from the head light of the oncoming vehicle in FIG. 5, for example) may be recognized and removed with respect to the high luminance points due to the light from the tail lamp of the preceding vehicle and the reflection light from the road side reflection object based on difference in color, luminance (relatively high luminance), features such as motion (relatively high relative speed), etc.

Next, a concrete way of setting the near infrared projection determination threshold and the near infrared non-projection determination threshold is described.

Here, at first, spectral response characteristics of the camera 12 are described.

Figure 6:
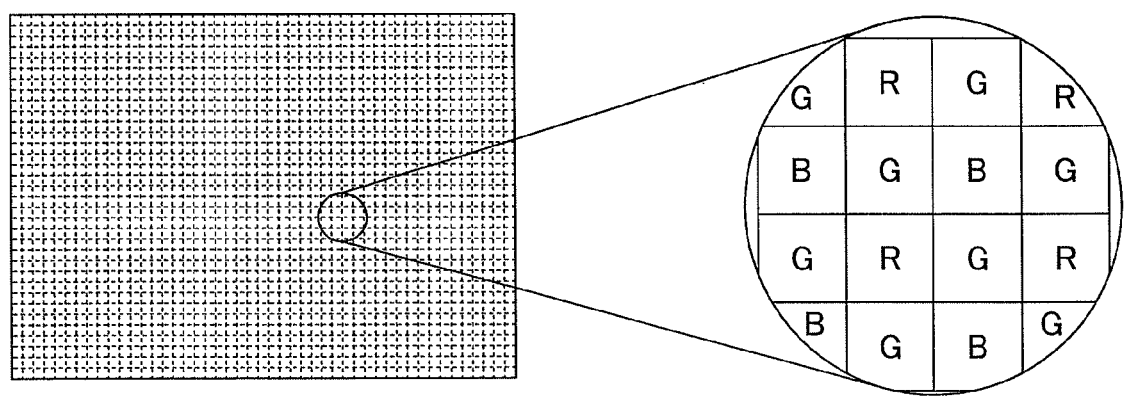
FIG. 6 is a diagram for illustrating an example of a pixel configuration (CMOS imager color Bayer array) of the camera 12.
Figure 7:
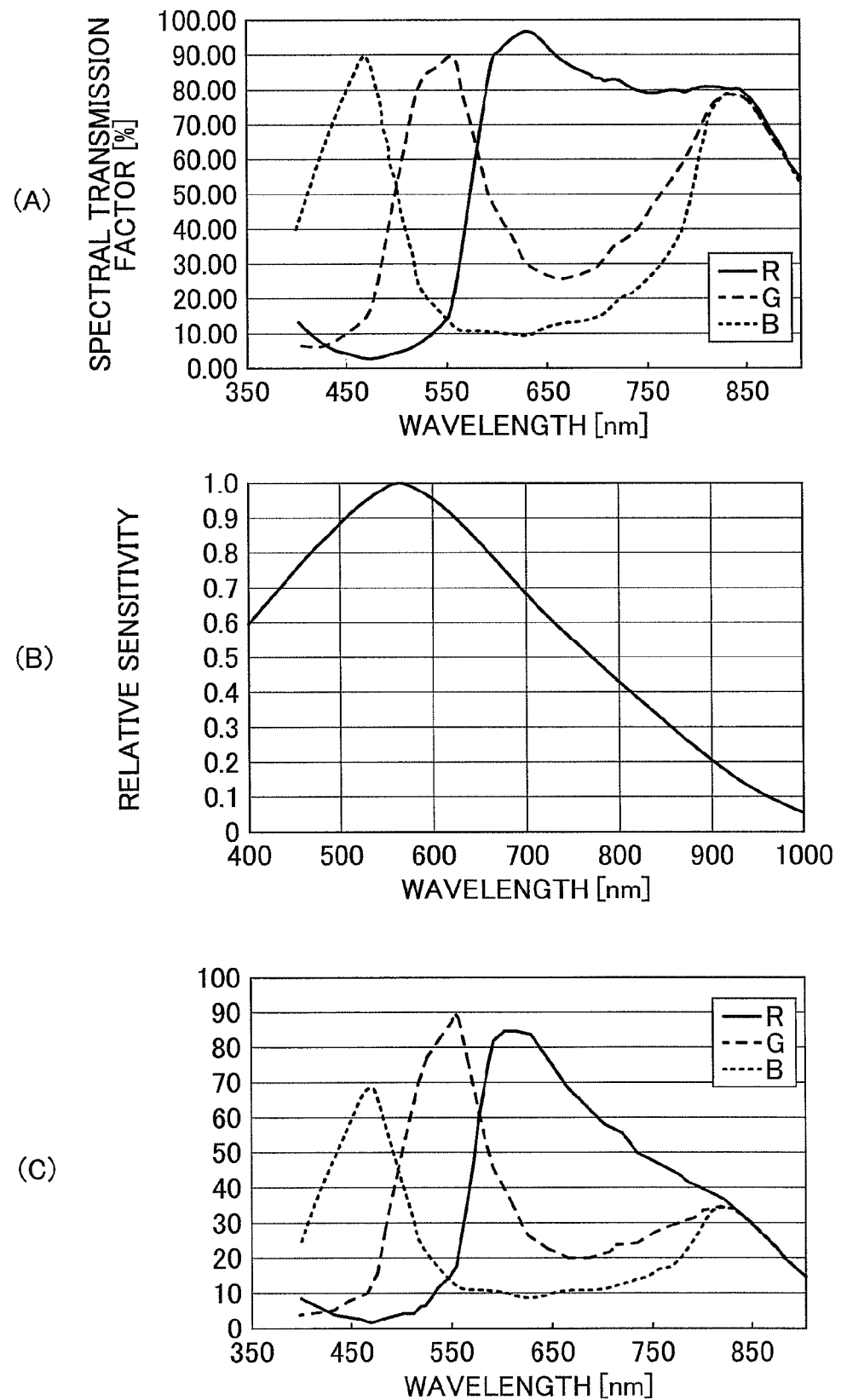
FIG. 7 is a diagram for illustrating an example of spectral response characteristics of the camera 12.

FIG. 6 is a diagram for illustrating an example of a pixel configuration (CMOS imager color Bayer array) of the camera 12 which is a CMOS camera as an example. FIG. 7 is a diagram for illustrating an example of spectral response characteristics of the camera 12 wherein (A) is a graph for illustrating spectral transmission factor characteristics of a color filter used in the camera 12, (B) is a graph for illustrating a sensitivity characteristic of the camera 12 and (C) is a graph for illustrating spectral response characteristics of the camera 12.

As illustrated in FIG. 7(A), an infrared light cut filter for cutting light with infrared wavelength greater than 700 nm is provided in order to ensure color reproduction in a configuration where the near infrared light projection is not performed; however, in the embodiment where the near infrared light projection is performed, the infrared light cut filter is not provided in order to ensure sensitivity to the infrared light. FIG. 7(C) corresponds to a graph which is obtained by multiplying the characteristics in FIG. 7(A) by the characteristic in FIG. 7(B). It is noted that, as is apparent from FIG. 7, the details of the characteristics in FIG. 7(C) may differ according to the characteristics of the color filter and the imaging elements of the camera 12.

Figure 8:
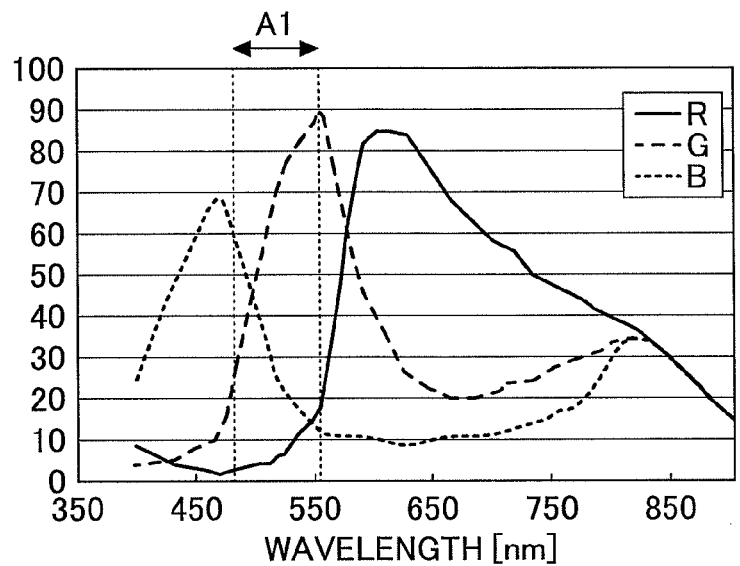
FIG. 8 is a diagram for illustrating a spectral region of a delineator in the spectral response characteristic in FIG. 7(C), and explaining a way of setting a near infrared non-projection determination threshold.
Figure 9:
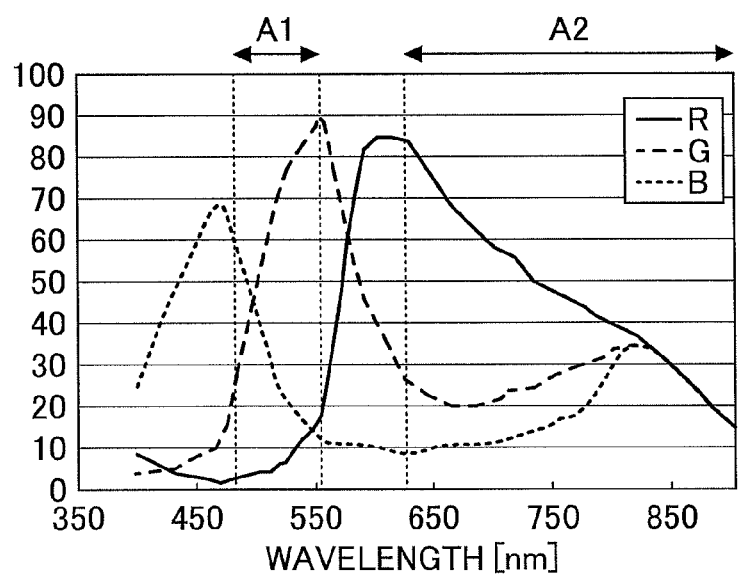
FIG. 9 is a diagram for illustrating a spectral region of a delineator in the spectral response characteristic in FIG. 7(C), and explaining a way of setting a near infrared projection determination threshold.

FIG. 8 is a diagram for illustrating a spectral region of a delineator (an example of the road side reflection object) in the spectral response characteristic in FIG. 7(C), and explaining a way of setting the near infrared non-projection determination threshold. FIG. 9 is a diagram for illustrating a spectral region of a delineator in the spectral response characteristic in FIG. 7(C), and explaining a way of setting a near infrared projection determination threshold.

As illustrated in FIG. 8 and FIG. 9, the reflection light of the delineator is contained mainly in a spectral response range A1 (about 550 nm through about 620 nm) in the non-near infrared light projection region while it is contained in a spectral response range A2 (greater than or equal to about 700 nm) in the near infrared light projection region. Thus, the reflection light of the delineator in the non-near infrared light projection region generates the RGB vector depending on the characteristics in the spectral response range A1 while the reflection light of the delineator in the near infrared light projection region generates the RGB vector depending on the characteristics in the spectral response range A2. Based on this point, the near infrared non-projection determination threshold may be set based in the following reference value using integrals $lr_{A1}$, $lg_{A1}$ and $lb_{A1}$ of the respective intensities (luminance values) of the RGB in the spectral response range A1 (which are obtained by integrating respective curves in integral range of the spectral response range A1 in FIG. 8).

Red component reference value $Refr = lr_{A1}/(lr_{A1} + lg_{A1} + lb_{A1})$

Green component reference value $Refg = lg_{A1}/(lr_{A1} + lg_{A1} + lb_{A1})$

Blue component reference value $Refb = lb_{A1}/(lr_{A1} + lg_{A1} + lb_{A1})$

In this case, for example, if the respective components of the RGB vector of the high luminance point have deviation within a plus-minus five percent with respect to the respective component reference values, it may be determined that the high luminance point is due to the reflection light from the delineator, and otherwise (i.e., if there is a deviation greater than five percent in any one of the components), it may be determined that the high luminance point is not due to the reflection light from the delineator (see step S412 in FIG. 4).

Similarly, the near infrared projection determination threshold may be set based on the following reference values using integrals $lr_{A1+A2}$, $lg_{A1+A2}$ and $lb_{A1+A2}$ of the respective intensities of the RGB in the spectral response ranges A1 and A2 (which are obtained by integrating respective curves in integral range of the spectral response ranges A1 and A2 in FIG. 9).

Red component reference value $$\mathrm{Ref}r = lr_{A1+A2}/(lr_{A1+A2}+lg_{A1+A2}+lb_{A1+A2})$$

Green component reference value $$\mathrm{Ref}g = lg_{A1+A2}/(lr_{A1+A2}+lg_{A1+A2}+lb_{A1+A2})$$

Blue component reference value $$\mathrm{Ref}b = lb_{A1+A2}/(lr_{A1+A2}+lg_{A1+A2}+lb_{A1+A2})$$

Such a near infrared projection determination threshold is suited for the case (overlapped region) where the near infrared light projection region is at least partly overlapped with the low beam illumination region, in particular. Similarly, in this case, for example, if the respective components of the RGB vector of the high luminance point have deviation within a plus-minus five percent with respect to the respective component reference values, it may be determined that the high luminance point is due to the reflection light from the delineator, and otherwise (i.e., if there is a deviation greater than five percent in any one of the components), it may be determined that the high luminance point is not due to the reflection light from the delineator (see step S412 in FIG. 4).

Alternatively, the near infrared projection determination threshold may be set based in the following reference value using integrals $lr_{A2}$, $lg_{A2}$ and $lb_{A2}$ (which are obtained by integrating respective curves in integral range of the spectral response range A2 in FIG. 9) of the respective intensities of the RGB in the spectral response range A2.

Red component reference value $$\mathrm{Ref}r = lr_{A2}/(lr_{A2}+lg_{A2}+lb_{A2})$$

Green component reference value $$\mathrm{Ref}g = lg_{A2}/(lr_{A2}+lg_{A2}+lb_{A2})$$

Blue component reference value $$\mathrm{Ref}b = lb_{A2}/(lr_{A2}+lg_{A2}+lb_{A2})$$

Such the near infrared projection determination threshold is suited for the case (non-overlapped region) where the near infrared light projection region is not overlapped with the low beam illumination region, in particular. Similarly, in this case, for example, if the respective components of the RGB vector of the high luminance point have deviation within a plus-minus five percent with respect to the respective component reference values, it may be determined that the high luminance point is due to the reflection light from the delineator, and otherwise (i.e., if there is a deviation greater than five percent in any one of the components), it may be determined that the high luminance point is not due to the reflection light from the delineator (see step S412 in FIG. 4).

Further, the high beam determination threshold in the case where the near infrared projection determination threshold has been selected (see step S410 in FIG. 4) may be set based on the following reference values using integrals $lr_{A1}$, $lg_{A1}$ and $lb_{A1}$ of the respective intensities of the RGB in the spectral response range A1 (which are obtained by integrating respective curves in integral range of the spectral response range A1 in FIG. 9) and the integrals $lr_{A2}$, $lg_{A2}$ and $lb_{A2}$ (which are obtained by integrating respective curves in integral range of the spectral response range A2 in FIG. 9) of the respective intensities of the RGB in the spectral response range A2.

Red component reference value $$\mathrm{Ref}r = (lr_{A1}+lr_{A2}+\alpha)/\{(lr_{A1}+lg_{A1}+lb_{A1})+(lr_{A2}+lg_{A2}+lb_{A2})+\alpha+\beta+\gamma\}$$

Green component reference value $$\mathrm{Ref}g = (lg_{A1}+lg_{A2}+\beta)/\{(lr_{A1}+lg_{A1}+lb_{A1})+(lr_{A2}+lg_{A2}+lb_{A2})+\alpha+\beta+\gamma\}$$

Blue component reference value $$\mathrm{Ref}b = (lb_{A1}+lb_{A2}+\gamma)/\{(lr_{A1}+lg_{A1}+lb_{A1})+(lr_{A2}+lg_{A2}+lb_{A2})+\alpha+\beta+\gamma\}$$

Here, $\alpha$, $\beta$ and $\gamma$ correspond to the increased amount of the luminance values in the respective color components due to the high beam. Similarly, in this case, for example, if the respective components of the RGB vector of the high luminance point have deviation within a plus-minus five percent with respect to the respective component reference values, it may be determined that the high luminance point is due to the reflection light from the delineator, and otherwise (i.e., if there is a deviation greater than five percent in any one of the components), it may be determined that the high luminance point is not due to the reflection light from the delineator (see step S412 in FIG. 4).

Figure 10:
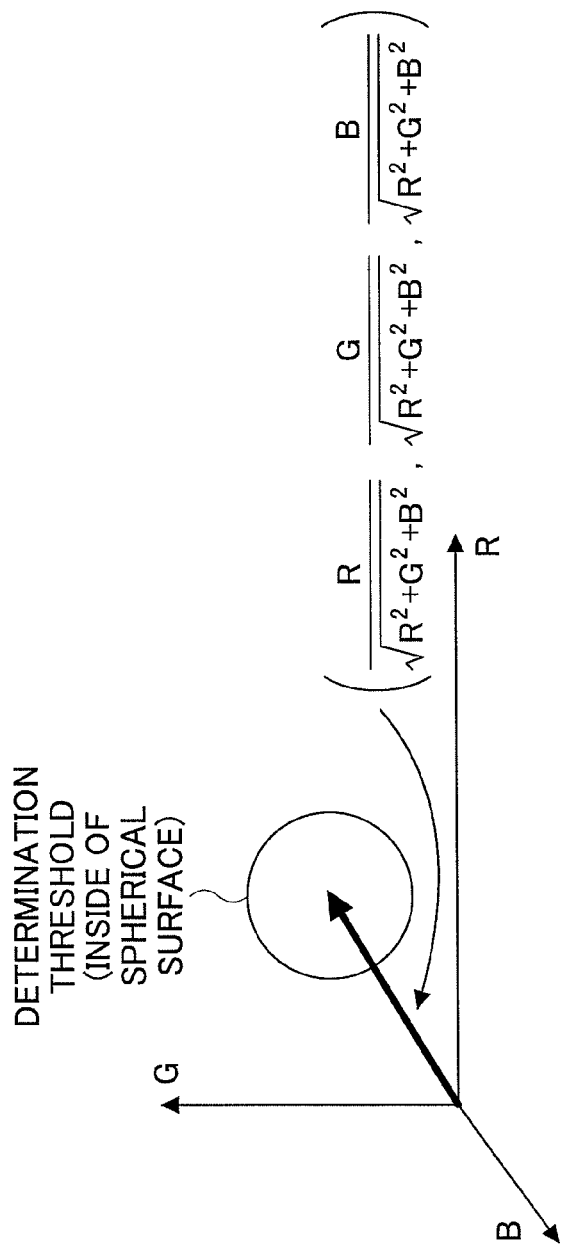
FIG. 10 is a diagram for illustrating another example of a determination threshold.

FIG. 10 is a diagram for illustrating another example of a determination threshold. In FIG. 10, a spherical surface defining the determination thresholds is illustrated in an orthogonal coordinate system with three axes corresponding to directions of the respective components of RGB.

The spherical surface is expressed by the following formula.

$$(R-\mathrm{Ref}r)^2+(G-\mathrm{Ref}g)^2+(B-\mathrm{Ref}b)^2 \le e^2$$

Where e is a tolerance error, and may be 0.05 (five percent), for example. (Refr, Refg, Refb) corresponds to the reference values described above, and differs between the case of the near infrared projection determination threshold, the case of the near infrared non-projection determination threshold, and the case of the high beam determination threshold. In this case, if the end point of the RGB vector of the high luminance point whose start point is the original point of the orthogonal coordinate system is included within the spherical surface, it may be determined that the high luminance point is due to the reflection light from the delineator, and if the end point is out of the spherical surface, it may be determined that the high luminance point is not due to the reflection light from the delineator (see step S412 in FIG. 4).

Next, an example of detecting the tail lamp which may be applied in step S416 in FIG. 4 is described.

FIG. 11 is a diagram for illustrating a spectral region of the tail lamp in the spectral response characteristic in FIG. 7(C), wherein (A) is a graph for illustrating the spectral region in the case where LEDs (light-emitting diode) are used for the tail lamp of the preceding vehicle, and (B) is a graph for illustrating the spectral region in the case where halogen lamps are used for the tail lamp of the preceding vehicle.

The light of the tail lamp is contained in the spectral region B1 in the case of the LEDs while it is contained in the spectral region B2 in the case of the halogen lamp. A tail determination threshold in the case where LEDs are used for the tail lamp of the preceding vehicle may be set based in the following reference value using integrals $lr_{LED}$, $lg_{LED}$ and $lb_{LED}$ of the respective intensities (luminance values) of the RGB in the spectral response range B1 (which are obtained by integrating respective curves in integral range of the spectral response range B1 in FIG. 11).

Red component reference value $\text{Ref}r = lr_{LED}/(lr_{LED} + lg_{LED} + lb_{LED})$ Green component reference value $\text{Ref}g = lg_{LED}/(lr_{LED} + lg_{LED} + lb_{LED})$ Blue component reference value $\text{Ref}b = lb_{LED}/(lr_{LED} + lg_{LED} + lb_{LED})$ Similarly, a tail determination threshold for determining the tail lamp is detected in the case where halogen lamps are used for the tail lamp of the preceding vehicle may be set based in the following reference value using integrals $lr_{hal}$, $lg_{hal}$ and $lb_{hal}$ of the respective intensities (luminance values) of the RGB in the spectral response range B2 (which are obtained by integrating respective curves in integral range of the spectral response range B2 in FIG. 11).

Red component reference value $\text{Ref}r = lr_{hal}/(lr_{hal} + lg_{hal} + lb_{hal})$ Green component reference value $\text{Ref}g = lg_{hal}/(lr_{hal} + lg_{hal} + lb_{hal})$ Blue component reference value $\text{Ref}b = lb_{hal}/(lr_{hal} + lg_{hal} + lb_{hal})$ In this case, for example, if the respective components of the RGB vector of the high luminance point have deviation within a plus-minus five percent with respect to the respective component reference values in the case of LEDs or halogen lamps, it may be determined that the high luminance point is due to the reflection light from the delineator, and otherwise, it may be determined that the high luminance point is not due to the reflection light from the delineator. Alternatively, the same idea may be used as is the case of the threshold of the spherical surface illustrated in FIG. 10. Specifically, the tail determination threshold with the spherical surface is as follows.

$(R - \text{Ref}r)^2 + (G - \text{Ref}g)^2 + (B - \text{Ref}b)^2 \le e^2$

Where e is a tolerance error, and may be five percent, for example. (Refr, Refg, Refb) corresponds to the reference values described above. Two spherical surfaces, one for the case of LEDs and one for the case of the halogen lamps, are formed. In this case, if the end point of the RGB vector of the high luminance point whose start point is the original point of the orthogonal coordinate system is included within any one of the spherical surfaces, it may be determined that the high luminance point is due to the light from the tail lamp of the preceding vehicle, and if the end point is out of the spherical surfaces, it may be determined that the high luminance point is not due to the light from the tail lamp of the preceding vehicle (see step S416 in FIG. 4). It is noted that if the type of the tail lamp (LEDs or halogen lamps) of the preceding vehicle is known via inter-vehicle communication, for example, the tail lamp determination threshold corresponding to the type of the tail lamp may be used separately.

It is noted that, in FIGS. 8 through 11, the ways of setting the threshold for detecting the delineator or the tail lamp to delimit between the delineator and the tail lamp are described; however, a determination threshold for directly delimiting between the delineator and the tail lamp may be used. In this case, the near infrared projection determination threshold may be expressed as a function for delimiting between the spherical surface (i.e., the spherical surface using the reference values for the near infrared projection determination threshold) illustrated in FIG. 10 and the spherical surface for the tail lamp determination threshold described with reference to FIG. 11. Similarly, the near infrared non-projection determination threshold may be expressed as a function for delimiting between the spherical surface (i.e., the spherical surface using the reference values for the near infrared non-projection determination threshold) illustrated in FIG. 10 and the spherical surface for the tail lamp determination threshold described with reference to FIG. 11.

Figure 12:
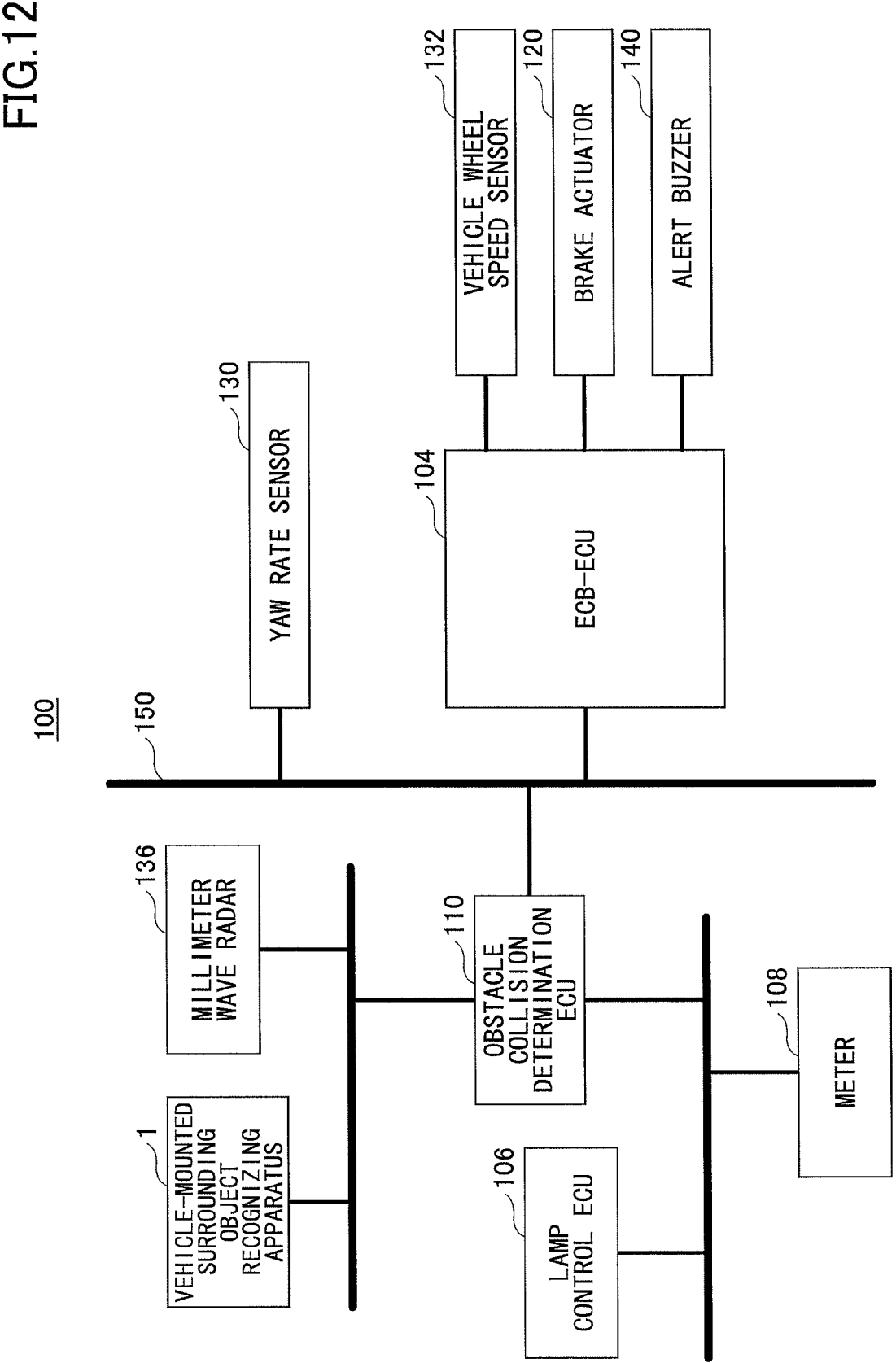
FIG. 12 is a diagram for illustrating a system of a drive support apparatus 100 according to an embodiment which includes the vehicle-mounted surrounding object recognizing apparatus 1 according to the embodiment.

FIG. 12 is a diagram for illustrating a system of a drive support apparatus 100 according to an embodiment which includes the vehicle-mounted surrounding object recognizing apparatus 1 according to the embodiment.

The drive support apparatus 100 includes the vehicle-mounted surrounding object recognizing apparatus 1, an ECB-ECU 104, a lamp control ECU 106 and an obstacle collision determination ECU 110, as illustrated in FIG. 12. The obstacle collision determination ECU 110 is connected to the vehicle-mounted surrounding object recognizing apparatus 1 and a millimeter wave radar 136 as well as the lamp control ECU 106 and a meter 108. Further, the obstacle collision determination ECU 110 is connected to the ECB-ECU 104 and a yaw rate sensor 130 via an appropriate bus 150 such as a CAN (controller area network). The ECB-ECU 104 is connected to a brake actuator 120, a vehicle wheel speed sensor 132, an alert buzzer 140, etc.

Figure 13:
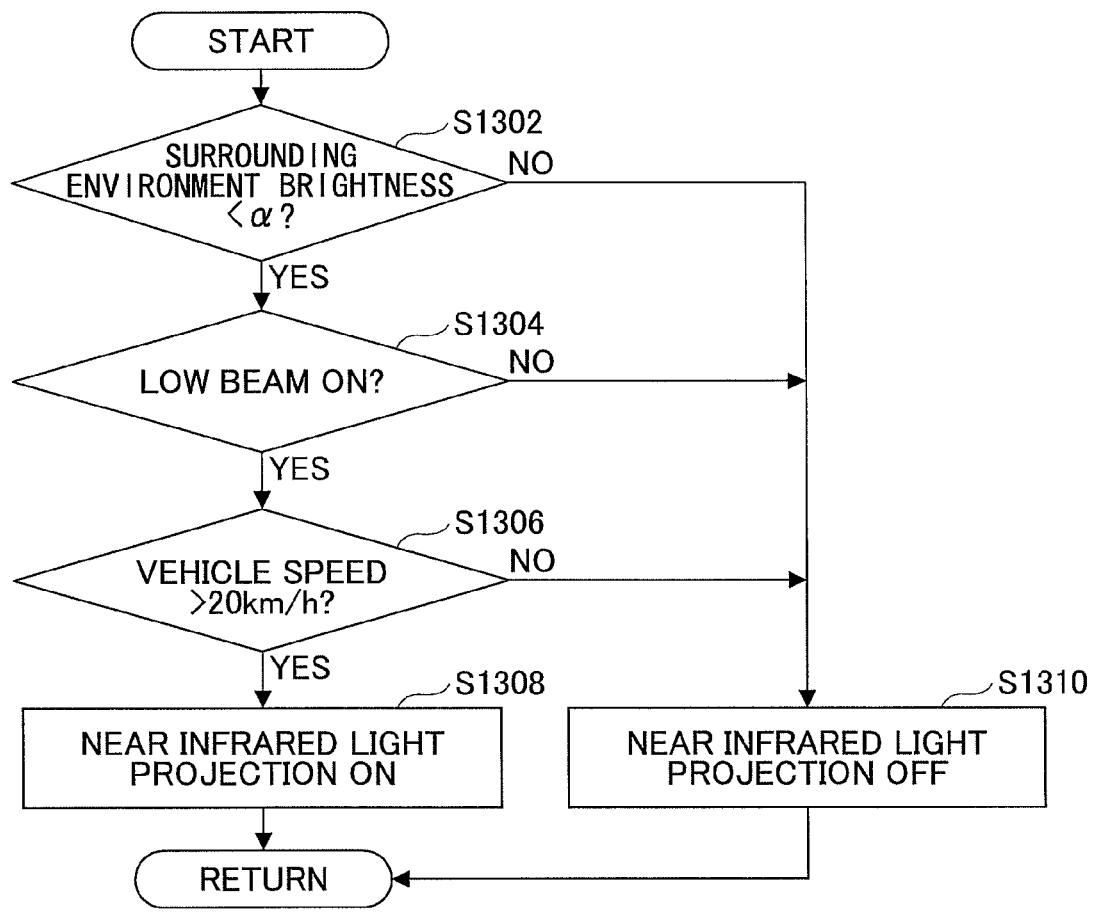
FIG. 13 is an example of a flowchart of a lamp illumination control executed by a lamp control ECU 106.

FIG. 13 is an example of a flowchart of a lamp illumination control executed by the lamp control ECU 106.

In step S1302, it is determined whether brightness in the surrounding environment is less than a predetermined threshold α. The brightness in the surrounding environment may be determined based on information from a daylight sensor, for example. If the brightness in the surrounding environment is less than the predetermined threshold α, the process routine goes to step S1304, and if the brightness in the surrounding environment is greater than or equal to the predetermined threshold α, the process routine goes to step S1310.

In step S1304, it is determined whether the low beam is in its ON state. If the low beam is in its ON state, the process routine goes to step S1306, and if the low beam is in its OFF state, the process routine goes to step S1310. It is noted that if the low beam is in its OFF state, the low beam may be turned on and the process routine may go to step S1306.

In step S1306, it is determined, based on the vehicle wheel speed sensor 132, whether the vehicle speed is greater than 20 km/h. If the vehicle speed is greater than 20 km/h, the process routine goes to step S1308, and if the vehicle speed is less than or equal to 20 km/h, the process routine goes to step S1310.

In step S1308, the near infrared light projection apparatus 6 is turned on.

In step S1310, the near infrared light projection apparatus 6 is turned off.

Figure 14:
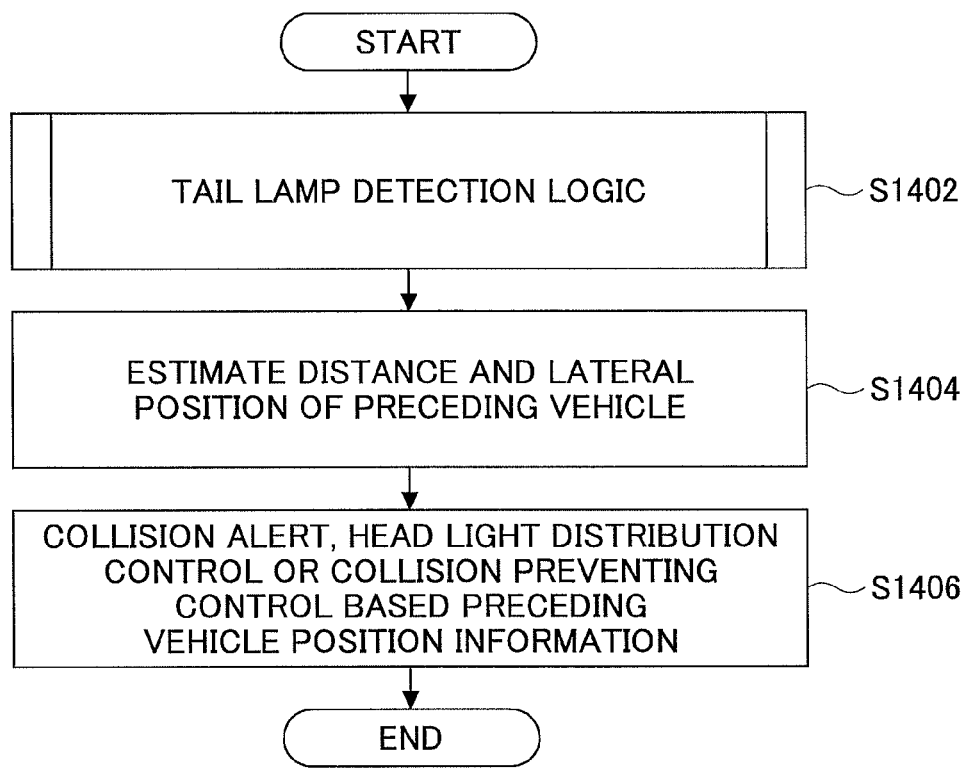
FIG. 14 is an example of a flowchart of a drive support control executed by the drive support apparatus 100.

FIG. 14 is an example of a flowchart of a drive support control executed by the drive support apparatus 100.

In step S1402, the vehicle-mounted surrounding object recognizing apparatus 1 detects the tail lamp of the preceding vehicle according to the process described and illustrated in FIG. 4.

In step S1404, the image processing device 14 of the vehicle-mounted surrounding object recognizing apparatus 1 calculates (estimates), based on the detected pixel positions of the tail lamp, a distance toward the preceding vehicle and a direction (lateral position) of the preceding vehicle. At the same time, the image processing device 14 may calculate, based on a change manner of the distance toward the preceding vehicle, the relative speed with respect to the preceding vehicle. The vehicle-mounted surrounding object recognizing apparatus 1 transmits such information to the lamp control ECU 106 and the obstacle collision determination ECU 110.

In step 1406, a drive support control is performed based on the detection result of the tail lamp by the vehicle-mounted surrounding object recognizing apparatus 1. For example, the obstacle collision determination ECU 110 determines that the probability of a collision between the preceding vehicle and the own vehicle based on detection result of the tail lamp by the vehicle-mounted surrounding object recognizing apparatus 1. If the obstacle collision determination ECU 110 determines that the probability of a collision between the preceding vehicle and the own vehicle is high, it causes the ECB-ECU 104 to output an alert with the alert buzzer 140, and promotes collision preventing operations by a driver such as a voluntary braking operation. Alternatively, if the obstacle collision determination ECU 110 determines a probability of the collision between the preceding vehicle and the own vehicle is high, it causes the ECB-ECU 104 to operate the brake actuator 120, thereby generating a brake force (intervening control). It is noted that determination logic for a probability of a collision with a preceding vehicle is known in the field of pre-crash safety control, and any logic may be adopted. Further, the determination of the probability of the collision with the preceding vehicle may be based on detection result of a radar sensor such as the millimeter wave radar 136. Further, the lamp control ECU 106 may perform a light distribution control for controlling based on the detection result of the tail lamp by the vehicle-mounted surrounding object recognizing apparatus 1. For example, the lamp control ECU 106 controls the light distribution of the head light 4 such that the preceding vehicle is not illuminated by the high beam (i.e., such that glare affecting the driver of the preceding vehicle is reduced). The light distribution control may be implemented by adjusting a swivel angle of the head light 4 or moving shades to change blocked portion where the illumination region of the high beam is partially blocked. It is noted that any one of the drive support controls may be performed alone, or any two or three drive support controls may be performed in combination.

The present invention is disclosed with reference to the preferred embodiments. However, it should be understood that the present invention is not limited to the above-described embodiments, and variations and modifications may be made without departing from the scope of the present invention.

For example, in the embodiments described above, as an exemplary embodiment, the determination threshold is changed according to whether the high beam is in its ON state (see step S410 in FIG. 4); however, such a change may be omitted. This is because the spectral response characteristic in the overlapped portion between the low beam illumination region and the near infrared light projection region does not change significantly according to the presence or absence of the high beam.

Further, in the embodiments described above, the determination threshold may be changed on a region basis, among three regions, that is to say, (1) the non-near infrared light projection region, (2) the overlapped region between the low beam illumination region and the near infrared light projection region, and (3) the near infrared light projection region which does not include the low beam illumination region. For example, the determination threshold may be changed according to the region of these three regions in which the high luminance point is included. The determination threshold, in the case where the high luminance point is included in the near infrared light projection region which does not include the low beam illumination region, the determination threshold may be set using integrals $lr_{A2}$, $lg_{A2}$ and $lb_{A2}$ of the respective intensities of the RGB in the spectral response range A2, as explained with reference to FIG. 9. On the other hand, the determination threshold, in the case where the high luminance point is included in the overlapped region between the low beam illumination region and the near infrared light projection region, the determination threshold may be set using integrals $lr_{A1+A2}$, $lg_{A1+A2}$ and $lb_{A1+A2}$ of the respective intensities of the RGB in the spectral response ranges A1 and A2, as explained with reference to FIG. 9. Further, if the high luminance point is included in the near infrared light projection region which does not include the low beam illumination region or in the overlapped region between the low beam illumination region and the near infrared light projection region, the determination threshold may be further changed according to the presence or absence of the high beam. In this case, the high beam determination threshold may be set by considering the increased luminance values ($\alpha$, $\beta$, $\gamma$) due to the high beam.

Further, in the embodiments described above, the near infrared projection determination threshold may be set based on the following reference values using integrals $lr_{A1}$, $lg_{A2}$ and $lb_{A1}$ of the respective intensities of the RGB in the spectral response range A1 and integrals $lr_{A2}$, $lg_{A2}$ and $lb_{A2}$ of the respective intensities of the RGB in the spectral response range A2 (which are obtained by integrating respective curves in integral range of the spectral response range A1 and A2 in FIG. 9).

Red component reference value $$Refr=(K \times lr_{A1}+lr_{A2})/\{K \times (lr_{A1}+lg_{A1}+lb_{A1})+(lr_{A2}+lg_{A2}+lb_{A2})\}$$

Green component reference value $$Refg=(K \times lg_{A1}+lg_{A2})/\{K \times (lr_{A1}+lg_{A1}+lb_{A1})+(lr_{A2}+lg_{A2}+lb_{A2})\}$$

Blue component reference value $$Refb=(K \times lb_{A1}+lb_{A2})/\{K \times (lr_{A1}+lg_{A1}+lb_{A1})+(lr_{A2}+lg_{A2}+lb_{A2})\}$$

Where K is a coefficient which may be smaller than or equal to 1 for the overlapped region between the low beam illumination region and the near infrared light projection region in the case where the high beam is in its OFF state. In this case, K may be changed such that the greater the distance from the own vehicle becomes, the smaller K becomes, and K is for the near infrared light projection region which does not include the low beam illumination region. Further, K may be greater than 1 if the high beam is in its ON state. Similarly, in this case, K may be changed such that the greater the distance from the own vehicle becomes, the smaller K becomes.

Figure 15:
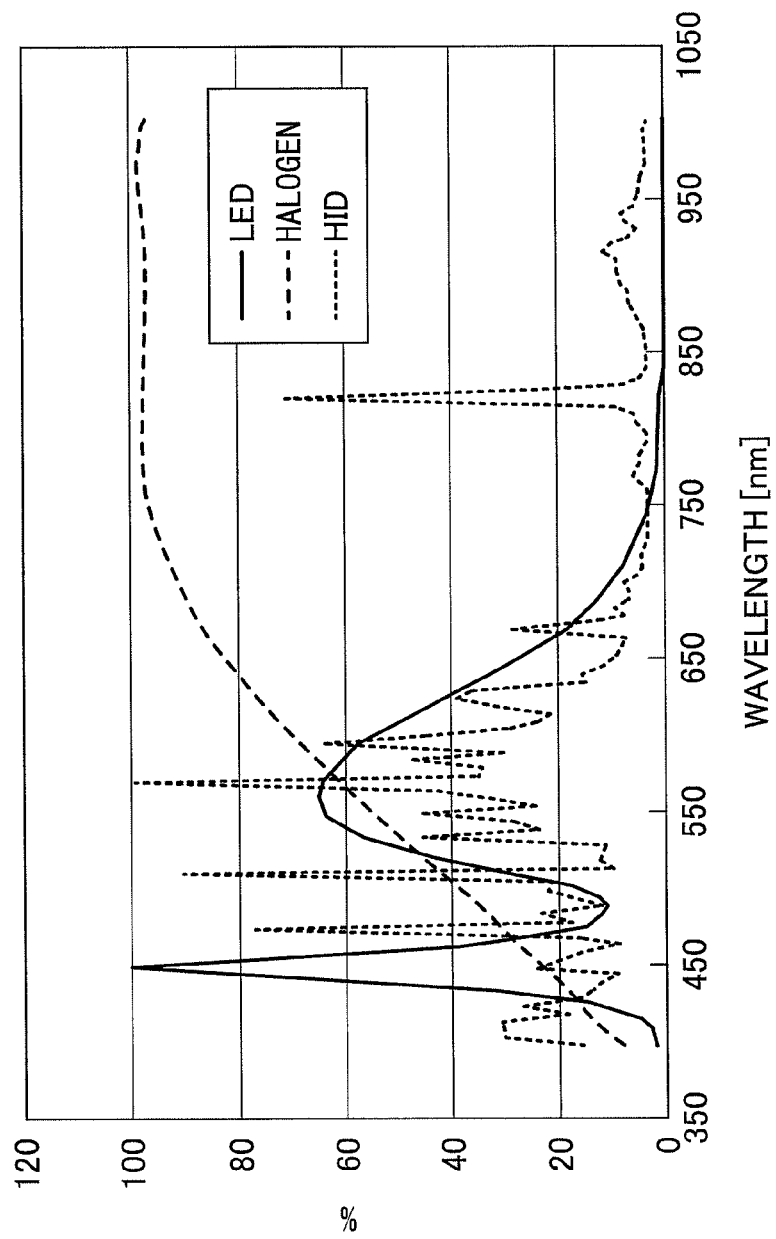
FIG. 15 is a diagram for illustrating spectral response characteristics of a head light 4 in the case of respective light sources (LED, halogen, HID).
Figure 16:
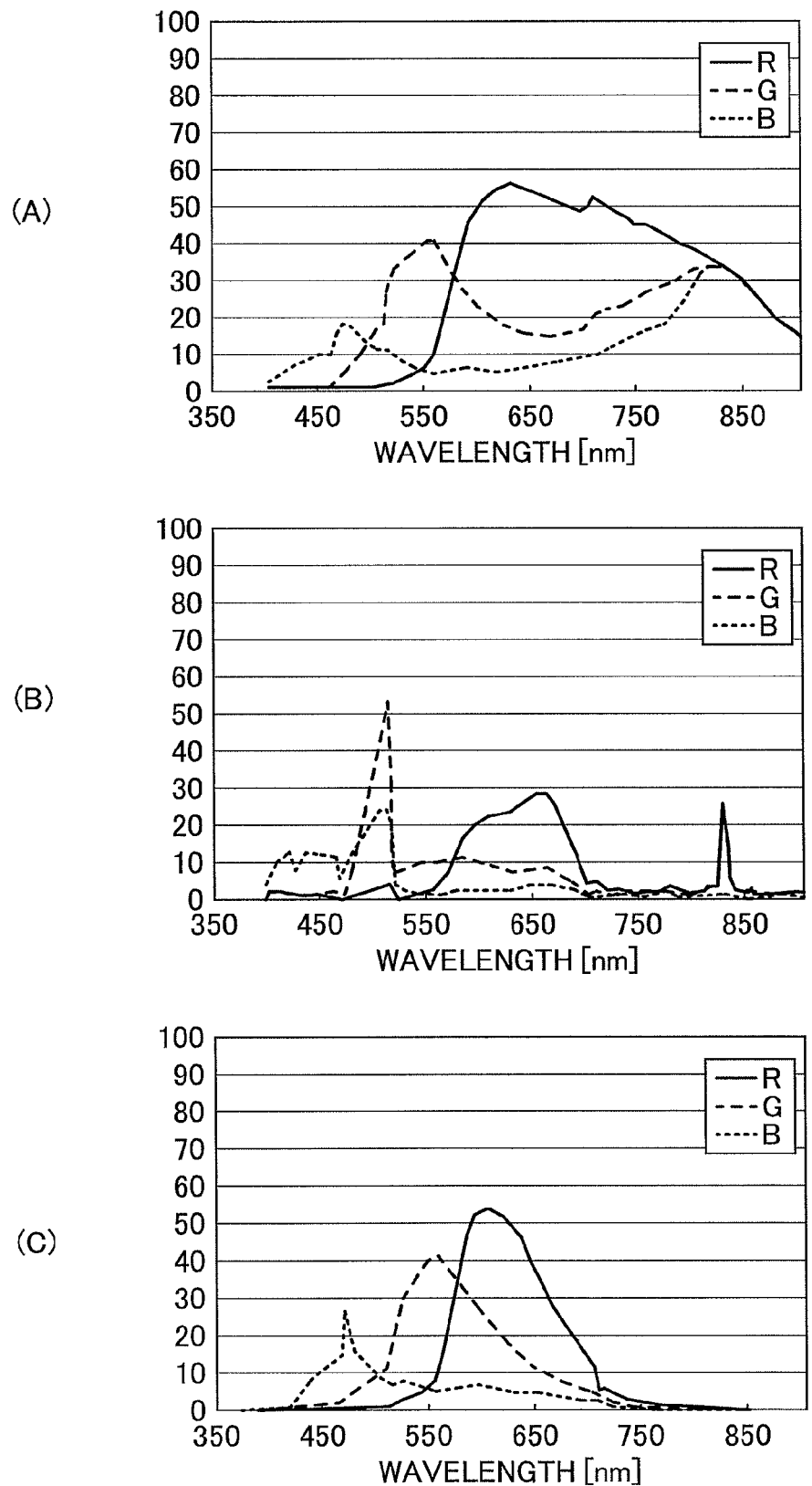
FIG. 16 is a diagram for illustrating an example of camera spectral luminance characteristics when spectral response characteristics of the head light 4 are considered.

Further, in the embodiments described above, a spectral response characteristic of the head light 4 is not considered in setting the determination thresholds; however, the spectral response characteristic of the head light 4 may be considered. Specifically, camera spectral luminance characteristics (see FIG. 16), which can be obtained by multiplying the RGB spectral response characteristics in FIG. 7(C) by a spectral characteristic of the head light 4 as illustrated in FIG. 15, may be used. In other words, in the embodiments described above, the RGB spectral response characteristics in FIG. 7(C) are used in setting the determination thresholds; however, instead of the RGB spectral response characteristics in FIG. 7(C), the camera spectral luminance characteristics in FIG. 16 may be used in setting the determination thresholds. FIG. 16 is a diagram for illustrating an example of camera spectral luminance characteristics wherein (A) is a graph for illustrating the spectral luminance characteristic in the case where halogen lamps are used as a light source of the head light 4, (B) is a graph for illustrating the spectral luminance characteristic in the case where HID (High Intensity Discharge) lamps are used as a light source of the head light 4, and (C) is a graph for illustrating the spectral luminance characteristic in the case where LEDs are used as a light source of the head light 4.

Further, in the embodiments described above, a delineator is assumed as an example of the road side reflection object. The delineator has orange color and rounded shape, and delineators are arranged regularly along a traveling road. However, the present invention can be applied to a road side reflection object other than the delineator which has an arbitrary color characteristic and an arbitrary shape.

Further, in the embodiments described above, the vehicle-mounted surrounding object recognizing apparatus 1 removes the road side reflection object such as a delineator or the like which may be easily misrecognized as a tail lamp so that the tail lamp of the preceding vehicle can be detected; however, in an embodiment, the vehicle-mounted surrounding object recognizing apparatus 1 may be an apparatus for detecting the road side reflection object such as a delineator or the like. This is because the detection result of the road side reflection object such as a delineator or the like can be utilized for various applications other than the application for detecting the tail lamp of the preceding vehicle. For example, the detection result of the road side reflection object such as a delineator or the like may be utilized for detecting a traveling lane of the vehicle, a future traveling direction of the vehicle, or performing a light distribution control of the head light 4. In the case of the light distribution control of the head light 4, the light distribution of the head light 4 may be changed such that glare affecting the driver of the preceding vehicle due to the light from the road side reflection object such as a delineator or the like is reduced.

Further, in the embodiments described above, the camera 12 for capturing the forward scene is used; however, a camera for capturing a side scene or a back scene may be used.

Further, in the embodiments described above, the RGB vector is used as an index value of a color component; however, the index value of a color component may be arbitrary, including a value which represents a proportion between the respective color components or a relative magnitude (intensity) of the respective color components. Further, an index value of a single color component, two color components, or more than three color components may be used.

The invention claimed is:

1. A vehicle-mounted surrounding object recognizing apparatus, comprising:
a camera that captures an environment surrounding an own vehicle; and
an image processing device; wherein
the image processing device is configured to process an image captured by the camera to calculate, using the single image at every processing cycle, an index value of a color component with respect to an image portion having a luminance value greater than a predetermined value, and determine whether the image portion is related to a light from a surrounding vehicle based on a relationship between the calculated index value of a color component and a predetermined threshold, and
the predetermined threshold is changed according to a lighting status of a forward lighting device of the own vehicle.

2. The vehicle-mounted surrounding object recognizing apparatus of claim 1, wherein the predetermined threshold delimits between the image portion related to the light from the surrounding vehicle and an image portion related to a road side reflection object.

3. The vehicle-mounted surrounding object recognizing apparatus of claim 2, wherein the index value of a color component represents a proportion of a predetermined color component,
if the proportion of the predetermined color component is within a predetermined range corresponding to the predetermined threshold, the image processing device determines that the image portion is related to the road side reflection object.

4. A vehicle-mounted surrounding object recognizing apparatus, comprising:
a camera that captures an environment surrounding an own vehicle; and
an image processing device; wherein
the image processing device is configured to process an image captured by the camera to calculate an index value of a color component with respect to an image portion having a luminance value greater than a predetermined value, and determine whether the image portion is related to a light from a surrounding vehicle based on a relationship between the calculated index value of a color component and a predetermined threshold, and
the predetermined threshold is changed according to a lighting status of a forward lighting device of the own vehicle,
wherein the camera is a near infrared camera, and
the lighting status of the forward lighting device of the own vehicle includes whether near infrared light is projected to a forward scene from the own vehicle.

5. The vehicle-mounted surrounding object recognizing apparatus of claim 1, wherein the lighting status of the forward lighting device of the own vehicle includes whether high beam light is projected to a forward scene from the own vehicle.

6. A vehicle-mounted surrounding object recognizing apparatus, comprising:
a camera that captures an environment surrounding an own vehicle; and
an image processing device; wherein
the image processing device is configured to process an image captured by the camera to calculate an index value of a color component with respect to an image portion having a luminance value greater than a predetermined value, and determine whether the image portion is related to a light from a surrounding vehicle based on a relationship between the calculated index value of a color component and a predetermined threshold, and
the predetermined threshold is changed according to a lighting status of a forward lighting device of the own vehicle,
wherein the predetermined threshold is changed according to whether the image portion having a luminance value greater than the predetermined value is located in a region where low beam light is projected but near infrared light is not projected, a region where low beam light and near infrared light are projected, or a region where low beam light is not projected but near infrared light is projected.

7. A drive support apparatus, comprising;
a vehicle-mounted surrounding object recognizing apparatus of claim 1; and
a control apparatus configured to perform a drive support control based on a detection result of the image portion, if it is determined by the vehicle-mounted surrounding object recognizing apparatus that the image portion is related to the light from the surrounding vehicle, wherein
the drive support control is at least one of an approach warning control for warning of an approach status to the surrounding vehicle; a collision preventing control for preventing a collision with the surrounding vehicle; and a light distribution control for controlling a illumination area of high beam light with respect to the surrounding vehicle.

8. A vehicle-mounted surrounding object recognizing method, comprising:
capturing, with a camera, an environment surrounding an own vehicle;
processing, with the image processing device, an image captured by the camera to calculate, using the single image at every processing cycle, an index value of a color component with respect to an image portion having a luminance value greater than a predetermined value, and determining whether the image portion is related to a light from a surrounding vehicle based on a relationship between the calculated index value of a color component and a predetermined threshold, wherein
the predetermined threshold is changed according to a lighting status of a forward lighting device of the own vehicle.

9. A vehicle-mounted surrounding object recognizing apparatus, comprising:
a camera that captures an environment surrounding an own vehicle; and
an image processing device; wherein
the image processing device is configured to process an image captured by the camera to calculate an index value of a color component with respect to an image portion having a luminance value greater than a predetermined value, and determine whether the image portion is related to a road side reflection object based on a relationship between the calculated index value of a color component and a predetermined threshold, and
the predetermined threshold is changed according to a lighting status of a forward lighting device of the own vehicle.

* * * * *